United States Patent [19]

Roberts, Jr.

[11] 3,764,662
[45] Oct. 9, 1973

[54] PROCESS FOR MAKING CARBON FIBER

[75] Inventor: Benjamin W. Roberts, Jr., Schenectady, N.Y.

[73] Assignee: General Electric Company, Schenectady, N.Y.

[22] Filed: Apr. 21, 1971

[21] Appl. No.: 136,134

[52] U.S. Cl. .................. 423/447, 264/29, 423/448
[51] Int. Cl. ............................................ C01b 31/07
[58] Field of Search ...................... 23/209.1, 209.2, 23/209.4, 209.3; 264/29; 423/447, 448, 449, 445

[56] References Cited
UNITED STATES PATENTS

| | | | |
|---|---|---|---|
| 3,532,466 | 10/1970 | Johnson | 23/209.4 |
| 3,399,252 | 8/1968 | Hough et al. | 23/209.3 X |
| 3,607,063 | 9/1971 | Douglas et al. | 23/209.3 |
| 3,533,743 | 10/1970 | Prescott et al. | 23/209.1 |
| 3,539,295 | 10/1970 | Ram | 23/209.1 |
| 3,656,904 | 4/1972 | Ram | 23/209.1 |
| 3,635,675 | 1/1972 | Ezekiel | 23/209.1 |

OTHER PUBLICATIONS

Allen et al. "Nature" Vol. 224, Nov. 15, 1969 Pages 684–685.

Primary Examiner—Edward J. Meros
Attorney—Paul A. Frank, Charles T. Watts, Gerhard K. Adam, Frank L. Neuhauser, Oscar B. Waddell and Joseph B. Forman

[57] ABSTRACT

Carbon fibers made by a process which involves heating a polyacrylonitrile fiber to a temperature below its carbonization temperature in an oxidizing atmosphere, carbonizing the fibers in a nonoxidizing atmosphere, such that combined heat and tension is applied to the fiber during at least one of the above steps, and then heating the carbon fibers in an inert atmosphere for at least one hour at from 1,300°–1,800° C., are improved by subjecting the carbon fibers to a post-heat treatment in an inert atmosphere at elevated temperatures of about 2,300°–3,000° C. for a very short time of 30–90 seconds.

2 Claims, 3 Drawing Figures

PATENTED OCT 9 1973 3,764,662

Inventor:
Benjamin W. Roberts Jr.,
by Gerhard K. Adam
His Attorney.

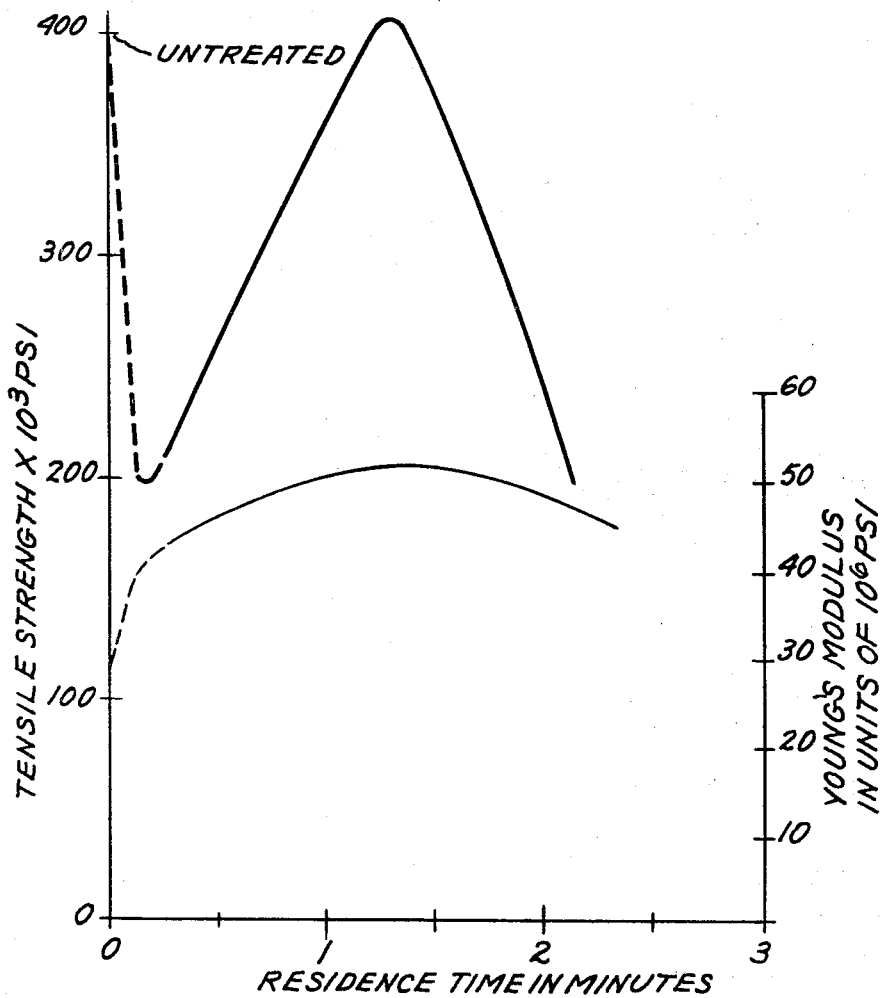

PROCESS FOR MAKING CARBON FIBER

Recent advances in composite materials indicate that carbon fiber composites have considerable potential for structural and engineering uses such as, for example, in aircraft engines and airframes. Especially important are the physical properties of the carbon fibers, e.g., high strength, high stiffness, and low weight. W. Watt, et al., The Engineer, May 27, 1966, p. 815, disclose the development of high modulus and high-strength carbon fibers. The article states that carbon-fiber-reinforced plastics composite materials have been made which are much stiffer than any reinforced plastics available and with a stiffness to weight ratio surpassing that of metals.

The Watts, et al. processes are further described in two U.S. patents to Johnson, et al., which disclose producing carbon fibers by passing a synthetic carbonaceous fiber (polyacrylonitrile) through a number of heat treatments under carefully controlled conditions. The first patent, U.S. Pat. No. 3,412,062, discloses a treatment schedule whereby fibers of polyacrylonitrile are wound onto a carbon former under slight tension and heated 22 hours in air at 220° C. Thereafter the fibers are heated from 200°–1,000° C. over 24 hours in an atmosphere of hydrogen, then the fibers are heated to 2,500° C. in argon for 2 hours at 1 atmosphere pressure and finally the fibers are heated to 2,900° C. under argon at 1 atmosphere pressure for 1/4 hour. The resulting fibers have a tensile strength of up to $260 \times 10^3$ psi and a Young's Modulus of $60 \times 10^6$ psi.

The second patent, U.S. Pat. No. 3,532,466, discloses a modification of the first process which involves initially heating fibers of polyacrylonitrile held under tension in an oxidizing atmosphere at from 200°–250° C. for a time sufficient to permit complete permeation of oxygen through the fibers, next carbonizing at a carbonizing temperature of to 1,000° C. in a hydrogen atmosphere, and then producing fibers of maximum strength by heating the fibers in an inert atmosphere such as argon for at least 1 hour at from 1,300°–1,800° C. The product has a tensile strength of $320 \times 10^3$ psi and a Young's Modulus of $35 \times 10^6$ psi.

These two processes are further discussed by D.H. Logsdail, Applied Polymer Symposia, No. 9, 245 (1969) which discloses that the first type (heat treated to 2,700° C.) has a high modulus of $60 \times 10^6$ psi and a moderate strength of $300 \times 10^3$ psi, while the second type (heat treated to only 1,500° C.) has a moderate modulus of $40 \times 10^6$ psi, but high strength of $450 \times 10^3$ psi. Carbon fibers of these types are commercially available as follows:

| Modulus Material | Young's Modulus psi × 10⁶ | Tensile Strength psi × 10³ |
|---|---|---|
| Morganite High Strength Fiber | | |
| Type I (high modulus) | 55–65 | 200–300 |
| Type II (high strength) | 35–45 | 350–450 |

Quite surprisingly, I have discovered a third type of carbon fiber which has both a high-tensile strength substantially equivalent to Morganite type II (hereinafter designated as carbon fiber Type II) and a high Young's modulus substantially equivalent to Morganite Type I (hereinafter designated as carbon fibers Type I). Now my novel carbon fibers which I shall designate as carbon fibers Type III are prepared by subjecting the carbon fiber Type II to a post-heat treatment at a high temperature for a very short period of time. The novel Type III carbon fibers have a tensile strength of at least $350 \times 10^3$ psi and a Young's modulus of greater than $45 \times 10^6$ psi.

In accordance with the present invention, I have discovered a method of making a high-tensile strength, high-Young's modulus carbon fiber comprising initially forming a carbon fiber by heating a polyacrylonitrile fiber to a temperature below its carbonizing temperature in an oxidizing atmosphere, carbonizing the fiber at a carbonizing temperature in a nonoxidizing atmosphere combined heat and tension being applied to the fiber during at least one of the above steps, then heating the carbon fibers in an inert atmosphere for at least 1 hour at from 1,300°–1,800° C. and subsequently subjecting the carbon fibers to a post-heat treatment in an inert atmosphere at a temperature of 2,300°–3,000° C. for 30–90 seconds. The carbon fiber produced has a tensile strength of at least $350 \times 10^3$ psi and a Young's modulus of greater than $45 \times 10^6$ psi.

This invention will be more clearly understood from the following description taken in conjunction with the following drawing in which:

FIG. 3 is a graphic representation of the effect on the properties of the fiber during the post-heat treatment with time and at a constant temperature of 2,950° C.

The process of making "high-tensile strength and high Young's modulus" involves a series of steps to convert the organic polymer fiber to a turbostratic, randomly stacked graphitic material. Initially polyacrylonitrile fibers (included also are some copolymers of acrylonitrile) are heated while under tension in an oxidizing atmosphere at from 200°–250° C. for a sufficient time to permit substantially complete permeation of oxygen throughout the individual fibers. Then the organic fibers are heated to a carbonizing temperature of up to about 1,000° C. under nonoxidizing conditions whereby the fiber shrinks and orientation of fiber particles occurs along the longitudinal axis of the fiber. Thereafter the carbon fibers are heated in an inert atmosphere, e.g., argon at a temperature of 1,300°–1,800° C. for at least 1 hour. These fibers have substantially the tensile strength and the Young's modulus as discussed for the commercially available Type II carbon fiber.

It is now that I have found that the Young's modulus can be substantially increased without decreasing the tensile strength by a post-heat treatment. This treatment involves subjecting the carbon fibers to an inert atmosphere, e.g., argon, at an elevated temperature of about 2,300°–3,000° C. for a very short period of time. The preferred temperature is from 2,600°–3,000° C. While there does appear to be a relationship between time and temperature, such that, the higher the temperature the shorter the time interval required, I have found that the time appears to be a critical factor and should be in the range of 30–90 seconds. When the time is too short there is a sharp decrease in the tensile strength with some increase in the Young's modulus, whereas when the time period is too long the tensile strength again falls off sharply while the Young's modulus remains in the range of the Type I carbon fibers.

Figure 1:
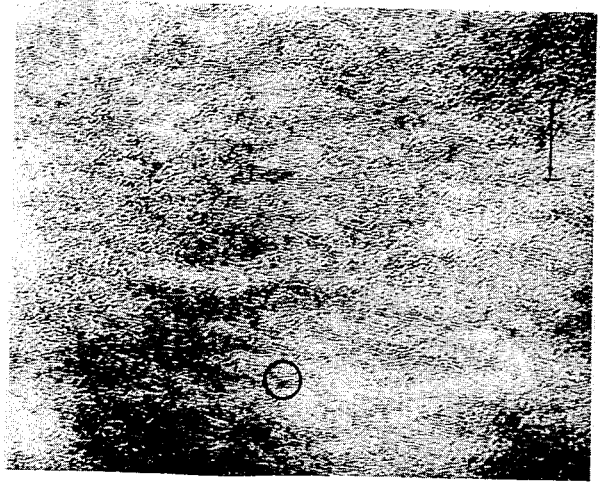
FIG. 1 is a photographic representation of a longitudinal section of a carbon fiber prior to the post-treatment having a high-tensile strength and a moderate-Young's modulus.

Referring now to the drawing, FIG. 1 is a phase-contrast electron micrograph of a polyacrylonitrile fiber which has been heat treated to about 1,500° C. and as it exists prior to the post-heat treatment of my invention. Circled are two smalled nuclei consisting of four to eight randomly stacked carbon atom planes of 3.4 A. spacing. The nuclei have a distinct preferred orientation introduced in an earlier stretching operation at an elevated temperature. The graphite basal planes tend to be aligned with normals perpendicular to the fiber axis but with a range of orientation of order ±30°.

Figure 2:
FIG. 2 is a photographic representation of a longitudinal section of a carbon fiber after the post-heat treatment having a high-tensile strength and a high-Young's modulus.

In FIG. 2, the carbon fibers are shown in a phase-contrast electron micrograph after a post-heat treatment at a temperature of 2,950° C. in a vertical carbon tube furnace heated by induction in gently flowing high purity argon. The residence time in the furnace was 50–70 seconds and no load was applied to the fiber bundles. It is observed that the short term heat treatment produces considerable alignment, growth and coalescence of the plane packets to a highly organized state. Bending of the turbostratic lattice and absence of transverse grain boundaries with respect to the fiber axis is noted. After the heat treatment at 2,950° C., the number of planes in a packet approaches 50. The packet nuclei have grown by absorbing neighbors at the raised temperatures and coalescing into the large packets shown in FIG. 2. The high tensile strength of the original Type II carbon fibers has persisted throughout the heat treatment and the Young's modulus has progressively increased from $34 \times 10^6$ psi to $59 \times 10^6$ psi.

My invention is further illustrated by the following example.

Samples of carbon fibers Type II (Morganite Type II) about 10 inches in length were passed through a vertical graphatization furnace. The furnace temperature was 2,950° C. ± 50° C. and flowing argon was used to prevent oxidation of the carbon fibers. The furnace residence times and the properties of the carbon fibers are set forth in the table below.

| Residence Time | Av. Tensile Strength($10^3$ psi) | Av. Young's Modulus($10^6$ psi) |
|---|---|---|
| Untreated | 400 | 29 |
| 15 sec. | 211 | 43.5 |
| 30 sec. | 264 | 46 |
| 60 sec. | 358 | 49 |
| 72 sec.[a] | 404 | 53 |
| 120 sec. | 235 | 48.5 |

[a]Two passes of 39 sec. plus 33 sec. were made

It is noted that the tensile strength is dependent on both the time and the temperature and, in some instances the optimum tensile strength may require more than 30 sec.

The results are graphically shown in FIG. 3. These clearly indicate that a post-heat treatment as herein described produces high tensile strength and high Young's modulus carbon fibers. The heating time is a critical feature and while the Young's modulus of the carbon fiber rises rapidly during the post-heat treatment, the tensile strength falls off during the initial phase of the heating and then rises again to a maximum as shown in FIG. 3.

It will be appreciated that the invention is not limited to the specific details shown in the examples and illustrations and that various modifications may be made within the ordinary skill in the art without departing from the spirit and scope of the invention.

I claim:

1. A process for making a carbon fiber comprising heating a polyacrylonitrile fiber to a temperature below its carbonizing temperature in an oxidizing atmosphere, carbonizing the fiber at a carbonizing temperature in a nonoxidizing atmosphere, combined heat and tension being applied to the fiber during at least one of the above steps, heating the carbon fiber in an inert atmosphere for at least one hour at from 1,300°–1,800° C., such that the resulting carbon fiber has an initial tensile strength of about $400 \times 10^3$ psi and Young's modulus of about $29 \times 10^6$ psi, and subsequently subjecting the carbon fiber to a post-heat treatment in an inert atmosphere at a temperature of about 2,950° C. for a short period of time as defined by FIG. 3 such that the carbon fiber has a tensile strength of at least $350 \times 10^3$ psi and a Young's modulus of greater than $45 \times 10^6$.

2. The process of claim 1, wherein the post-heat treatment of the carbon fiber produces alignment, growth and coalescence of the plane packets to a highly organized state as shown in FIG. 2, whereby the Young's modulus is increased to greater than $45 \times 10^6$ psi.

* * * * *